Dec. 10, 1963

R. S. SANFORD 3,113,996

ARTICLE SUPPORT

Filed Feb. 2, 1962

INVENTOR
Roy S. Sanford
BY *Scrivener & Parker*
ATTORNEYS

Dec. 10, 1963 R. S. SANFORD 3,113,996
ARTICLE SUPPORT
Filed Feb. 2, 1962 2 Sheets-Sheet 2

INVENTOR
Roy S. Sanford

BY Scrivener & Parker
ATTORNEYS

United States Patent Office 3,113,996
Patented Dec. 10, 1963

3,113,996
ARTICLE SUPPORT
Roy S. Sanford, Woodbury, Conn.
(Box 400, Seymour, Conn.)
Filed Feb. 2, 1962, Ser. No. 170,669
1 Claim. (Cl. 174—67)

This invention relates to article supports, and more particularly to article supports adapted to be associated with the cover plates of wall mounted electrical outlet boxes.

It is often found desirable to provide wall mounted hooks, small shelves and the like, which can be secured to the wall without damaging the latter in any way, and this is particularly true in many apartments. The present invention provides means for doing this by associating the hook or article support with the conventional cover plate commonly used to cover switch boxes and electrical outlets in the walls of buildings, the hook or support being either integral with the cover plate or a separate part supported and positioned by the cover plate and the means normally used for securing the cover plate to the outlet box.

It is accordingly an object of the invention to provide such a cover plate which includes an integral article support or bracket.

A further object of the invention is to provide a cover plate adapted to receive and support a variety of article supports interchangeably.

Another object is the provision of novel means for attaching such a bracket or support to an electrical outlet box cover plate.

These and other objects and features of the invention will be more readily understood by reference to the following description and the accompanying drawings. The invention is not to be considered as limited thereby, however, reference being had to the appended claim for a definition of the limits of the invention.

In the drawings, wherein similar reference characters are utilized to designate similar parts throughout the several views.

Figure 1:
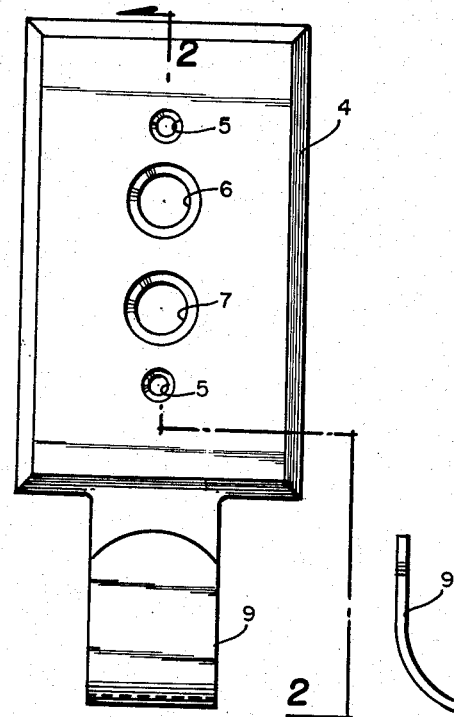
FIG. 1 is a plan view of a support embodying one form of the invention.
Figure 2:
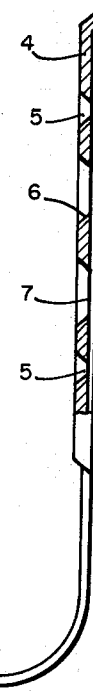
FIG. 2 is a side elevation, partially in section, taken along lines 2—2 of FIG. 1.
Figure 6:
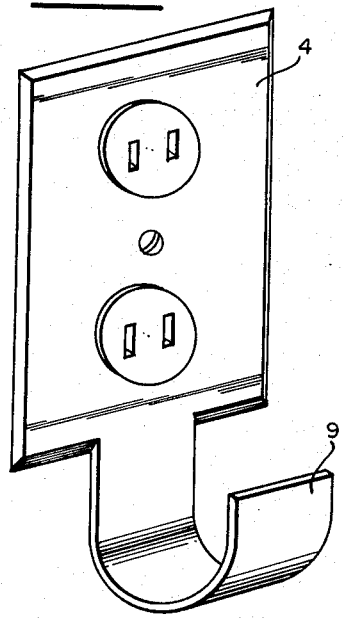
FIG. 6 is a perspective view of a structure similar to that shown in FIG. 1.

Referring first to FIG. 1, a cover plate 4 is provided with apertures 5 for screws to attach the plate to an electrical outlet box mounted in a wall, and access apertures 6 and 7, these being for the on and off buttons respectively of an electric switch. The plate, preferably formed of metal, is provided along its periphery on the inner or wall-engaging side of the plate with a flange 8, the edge or end of the flange being adapted to engage the wall. The lower end of the plate is provided with an integral hook or article support 9, which can be of any desired shape to support an article, the embodiment shown, for example, being adapted to support a coiled electric extension cord or the like. Although the support is shown as extending from the bottom of the plate, it can as well extend from the side or from the top, depending on the type of article or articles to be supported. The flange 8 is shown in FIG. 2. A similar plate is shown in perspective in FIG. 6, the plate 4 having an integral hook 9 at its lower end.

Figure 3:
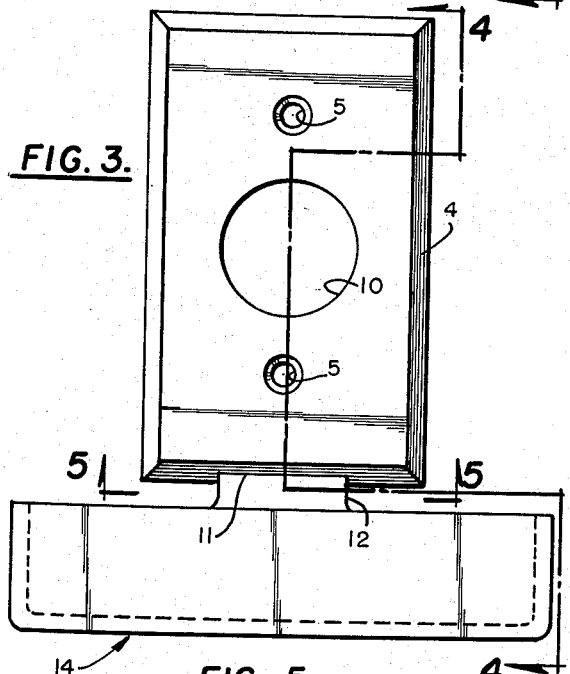
FIG. 3 is a plan view showing another embodiment of the invention.
Figure 4:
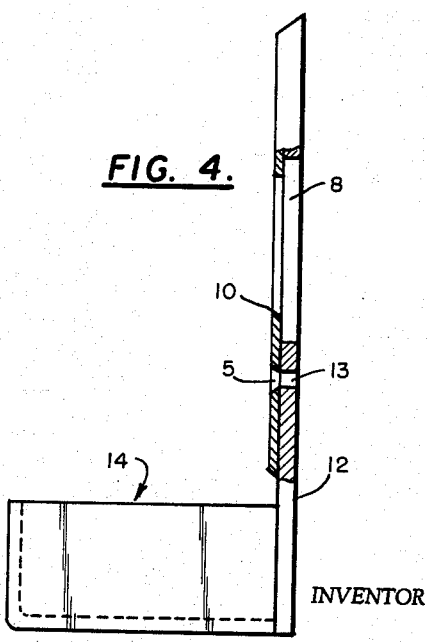
FIG. 4 is a side elevation, partially in section, taken along lines 4—4 of FIG. 3.
Figure 5:
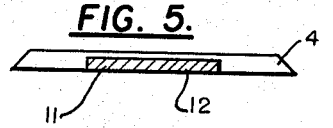
FIG. 5 is an end view of the structure shown in FIG. 3 taken along lines 5—5.

In FIGS. 3, 4 and 5, a wall plate 4 is provided with screw apertures 5 and an access aperture 10 for the insertion of the plug on the end of an extension cord. The flange 8 is provided at the lower end of the plate with a notch 11 adapted to receive a tongue 12, the upper end of the tongue having a screw aperture 13 adapted, when the parts are assembled, to register with the lower screw aperture 5 in the plate. Thus when the plate is secured to the wall outlet box by screws through apertures 5, the tongue 12 is located by the notch 11 and by the lower screw, and is supported by the screw, the end of tongue 12 being hidden by the plate. A box-like shelf 14 is shown formed on the lower end of the tongue, but it will be understood that the article carrying support formed on the tongue may take other shapes as may be desired, and a plate is shown in FIGS. 3, 4 and 5 which can interchangeably accept a number of different article supports without change in the plate.

Figure 7:
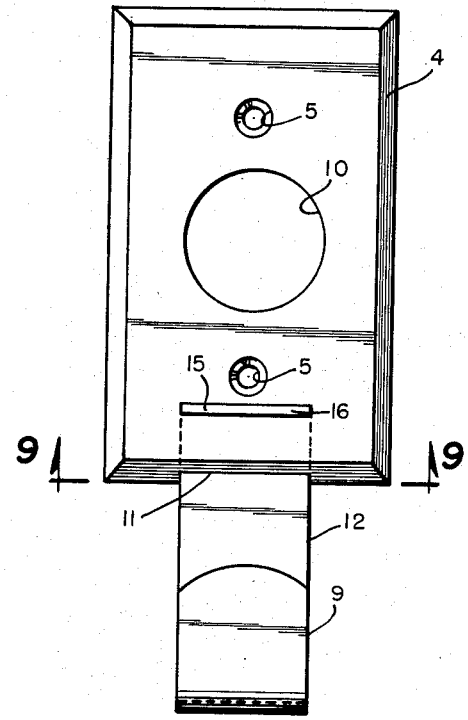
FIG. 7 is a plan view showing another embodiment of the invention.
Figure 8:
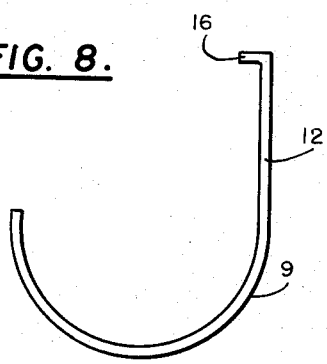
FIG. 8 is a side elevation of a portion of the structure of FIG. 7.
Figure 9:
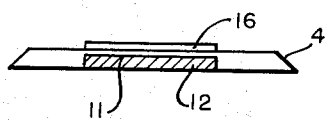
FIG. 9 is an end view of FIG. 7 taken along lines 9—9.

In many cases however, the screw apertures 5 are differently arranged in the plate, or a single aperture is used in the center of the plate. In cases of this kind, the plate and article support may be arranged as shown in FIGS. 7–9. In this arrangement, the plate holding screw is not relied on to directly hold the article support. The lower end of the plate, for example, is provided with notch 11 in flange 8, as was the case in FIG. 3. In addition, however, a slot 15 extends through the plate above and adjacent the notch 11, the hook 9 having an upwardly extending tongue 12 adapted to extend through notch 11 and under the wall plate, and the tongue being provided at its upper end with a lip 16 disposed at right angles to the tongue and adapted to extend into slot 15. Thus when the parts are assembled with the cover plate secured to the wall outlet box by screws extending through screw apertures 5, the plate is securely supported by the outlet box, and the hook 9 and tongue 12 are positioned by notch 11 and the engagement of lip 16 with slot 15, while the weight of the tongue and hook is supported by engagement of lip 16 with slot 15, the upper end of the tongue being behind the lower end of the wall plate.

From the foregoing it will be understood that the embodiments illustrated and described provide article supports for a wall without damage to the wall, and that they may be readily adapted to hold various articles such as coiled extension cords, electric razors, shelves, thermometers, calendars, mirrors, and other articles too numerous to mention. In addition the article supports can be at either end or at either side of the wall plate.

Although the invention has been illustrated and described with considerable particularity, it is not to be considered as being limited thereby, reference being had to the appended claim for a definition of the limits of the invention.

What is claimed is:

A wall mounted article support comprising a cover plate for attachment to a wall mounted electrical outlet box, said plate having a flange around the periphery of the plate on one side with the edge of the flange being adapted to engage the wall when the plate is secured to the outlet box, a notch in the flange at one end of the plate, at least one aperture in the plate adapted to receive a screw for attaching the plate to the outlet box, an aperture in the plate for access to the outlet box, and an article supporting bracket having an elongated portion adapted to extend through said notch and under said plate between the latter and the outlet box and adapted to be positioned against sideward movement by said notch, the end portion of said elongated bracket portion having an aperture adapted to register with the first named aperture in said plate, said bracket when assembled with the plate on the outlet box being supported by a screw extending through said registering apertures and held against rotation about the screw by said notch in the plate, the depth of said notch and the thickness of the elongated portion of said supporting bracket being so dimensioned as to insure engagement of the entire edge of said flange with the wall when the plate is attached to the outlet box by said screw.

References Cited in the file of this patent

UNITED STATES PATENTS

| | | |
|---|---|---|
| 2,461,936 | Stone | Feb. 15, 1949 |
| 2,559,151 | Getzoff | July 3, 1951 |
| 2,892,172 | McGann | June 23, 1959 |
| 2,943,138 | Reager | June 28, 1960 |